(12) United States Patent
Zhao et al.

(10) Patent No.: US 12,013,900 B2
(45) Date of Patent: Jun. 18, 2024

(54) TELECONNECTION PATTERN-ORIENTED SPATIAL ASSOCIATION CLUSTERING METHOD

(71) Applicant: SUN YAT-SEN UNIVERSITY, Guangdong (CN)

(72) Inventors: Tongtiegang Zhao, Guangdong (CN); Haoling Chen, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 17/926,133

(22) PCT Filed: Jul. 20, 2020

(86) PCT No.: PCT/CN2020/103083
§ 371 (c)(1),
(2) Date: Nov. 18, 2022

(87) PCT Pub. No.: WO2022/011728
PCT Pub. Date: Jan. 20, 2022

(65) Prior Publication Data
US 2023/0185858 A1   Jun. 15, 2023

(30) Foreign Application Priority Data
Jul. 16, 2020 (CN) .......................... 202010687419.4

(51) Int. Cl.
*G06F 16/906* (2019.01)
*G06F 16/9537* (2019.01)

(52) U.S. Cl.
CPC ........ *G06F 16/906* (2019.01); *G06F 16/9537* (2019.01)

(58) Field of Classification Search
CPC ............................ G06F 16/906; G06F 16/9537
See application file for complete search history.

(56) References Cited

U.S. PATENT DOCUMENTS

| 11,668,856 | B2 * | 6/2023 | Ma ......................... | G01W 1/02 702/3 |
| 2013/0024118 | A1 | 1/2013 | Gershunov et al. | |
| 2018/0058932 | A1 * | 3/2018 | Yan ....................... | G01J 3/2823 |

FOREIGN PATENT DOCUMENTS

| CN | 104376329 | 2/2015 |
| CN | 107403004 | 11/2017 |
(Continued)

OTHER PUBLICATIONS

"International Search Report (Form PCT/ISA/210) of PCT/CN2020/103083," mailed on Apr. 19, 2021, with English translation thereof, pp. 1-6.

*Primary Examiner* — Baoquoc N To
(74) *Attorney, Agent, or Firm* — JCIPRNET

(57) ABSTRACT

A spatial auto-correlation clustering method for a remote correlation mode. By taking the degree of remote correlation between each spatial grid cell and an adjacent cell thereof into consideration, and on the basis of the definition of a local Moran index, an original value of a correlation coefficient is used without performing centralization processing, thereby improving a local Moran index calculation formula to obtain a new local indicator of spatial auto-correlation (LISAAC), such that the detection of a significant positive or negative remote correlation aggregation range is realized, and the identification of an abnormal value (that is, a non-significant or negative-value grid appears in a significant positive-value area, and a non-significant or positive-value grid appears in a significant negative-value area) is realized. By means of the method, the spatial clustering of different types of remote correlations can be realized according to the standardization property of a remote correlation coefficient itself.

10 Claims, 6 Drawing Sheets

(56) References Cited

FOREIGN PATENT DOCUMENTS

| CN | 107563554 | 1/2018 |
| CN | 109766395 | 5/2019 |
| CN | 109856702 | 6/2019 |
| CN | 110399634 | 11/2019 |

* cited by examiner

TELECONNECTION PATTERN-ORIENTED SPATIAL ASSOCIATION CLUSTERING METHOD

CROSS-REFERENCE TO RELATED APPLICATION

This application is a 371 of international application of PCT application serial no. PCT/CN2020/103083, filed on Jul. 20, 2020, which claims the priority benefit of China application no. 202010687419.4, filed on Jul. 16, 2020. The entirety of each of the above mentioned patent applications is hereby incorporated by reference herein and made a part of this specification.

TECHNICAL FIELD

The present invention relates to the field of meteorology and climatology, in particular to a teleconnection pattern-oriented spatial association clustering method.

BACKGROUND

An interrelationship between large-scale climate factors and precipitation anomalies around the world has always been paid attention to. The strength and pattern of such a teleconnection effect can be quantified by means of the correlation coefficients between climate indices (namely indices of climate factors) and monthly or seasonal precipitation in various regions or seasonal precipitation in various regions. In actual calculation, precipitations in neighboring regions are often not independent, but have a relatively strong correlation. In order to detect this kind of spatial association, a spatial association analysis is often carried out by means of a local indicator of spatial association (LISA) to detect whether there is information about a spatial pattern in variables. For a teleconnection pattern measured by a correlation coefficient, the coefficient already has a standardized property. While for a commonly used LISA such as a Moran index, variables will be standardized during its calculation according to a definition described in Chapter four of "Quantitative Geography", so an obtained result can only reflect a relative distribution of low and high values in the same time and indicator, and it is difficult to horizontally compare calculation results in different time or indicators. Large-scale climate factors often have relatively strong inter-seasonal or inter-annual periodicity, so teleconnection strengths and patterns in different seasons are usually quite different. Therefore, it is necessary to improve the conventional LISA in order to facilitate spatial clustering patterns of teleconnection patterns in different seasons and different indicators.

SUMMARY

In order to solve the technical defect that a result obtained by a conventional local indicator of spatial association (LISA) can only reflect a relative distribution of low and high values in the same time and indicator, and it is difficult to horizontally compare calculation results in different time or indicators, the present invention provides a teleconnection pattern-oriented spatial association clustering method.

In order to achieve the above objective, the present invention adopts the following technical solution:

A teleconnection pattern-oriented spatial association clustering method, including following steps:

S1: acquiring coordinate information of a spatial grid in a research region, and calculating a spatial weight matrix according to the coordinate information;

S2: acquiring grid-scale precipitation data in the research region and large-scale climate indices in a same time range, and obtaining a precipitation and climate index time series;

S3: calculating a correlation coefficient r of precipitation and the climate index grid by grid according to the obtained precipitation and climate index time series;

S4: calculating a local indicator of spatial association of anomaly correlation (LISAAC) grid by grid according to the correlation coefficient r and the spatial weight matrix;

S5: rearranging the precipitation and climate index time series in the step S2 to obtain a new precipitation and climate index time series, and repeating the steps S3 to S4 until a preset number n of iterations is reached;

S6: establishing a reference empirical distribution H according to n groups of random LISAAC obtained in the step S4; and S7: obtaining a classification result of each grid at a specified significance level according to the observed LISAAC, the observed correlation coefficient r, and the empirical distribution H.

In the step S1 of calculating the spatial weight matrix, a distance is represented with a Euclidean distance.

In the step S1 of calculating the spatial weight matrix, a weight is represented with an inverse of square of the distance.

In the step S2, an observed climate index is denoted as:

$X=[x_t]$ where $x_t$ is an index value observed in a t-th year, and X is a set comprising of $x_t$; the total number of grids is denoted as N, i is taken as a grid index, and similarly, the observed precipitation is denoted as:

$Y=[y_{t,i}]$

Where $y_{t,i}$ is an index value observed on the i-th grid in a t-th year, and Y is a set comprising of $y_{t,i}$.

In the step S3, for the given grid i, the correlation coefficient between a climate factor and the precipitation is obtained from sequences X and Y:

$$r = \frac{\sum_t (rx_t - \overline{rx})(ry_t - \overline{ry})}{\sqrt{\sum_t (rx_t - \overline{rx})^2} \sqrt{\sum_t (ry_t - \overline{ry})^2}}$$

where $rx_t(ry_t)$ represents the climate factor in the t-th year, that is, an order of the observed precipitation in an original sequence, and $\overline{rx}(\overline{ry})$ represents a mean value of a sequence $rx_t(ry_t)$; a value of r is between −1 and 1, and when two variables are completely monotonically correlated, the value of r is 1 or −1; and for the grid i, the calculated correlation coefficient can be denoted as $r_i$, such that a set $R=[r_i]$ comprising of the correlation coefficient can be obtained.

In the step S4, a calculation formula for the local indicator of spatial association of anomaly correlation (LISAAC) is specifically as follows:

$$C_i = r_i \frac{\sum_{j=1, j \neq i}^{N} w_{i,j} r_j}{\sum_{j=1, j \neq i}^{N} w_{i,j}}$$

where $w_{i,j}$ is a weight coefficient for that relates $r_i$ to $r_j$ of a neighboring grid;

$$\sum_{j=1, j\neq i}^{N} w_{i,j} r_j / \sum_{j=1, j\neq i}^{N} w_{i,j}$$

is a spatial weighted correlation coefficient of the neighboring grid of the grid i; $C_i$ describes a strength of a relationship between $r_i$ and $r_j$ of the neighboring grid of the grid i; and the weight coefficient in the formula is an important parameter influencing $C_i$.

In the above solution, the correlation coefficient is used without performing centralization processing for the LISAAC calculation in the step S4.

In order to enable the weight coefficient attenuated with an increase of the distance, the distance is calculated by means of inverse distance weighting and a Euclidean algorithm, and the inverse of square of the distance is used as a distance weight coefficient between two grids:

$$w_{i,j} = \frac{1}{d(i, j)^2}$$

where d(i, j) is a Euclidean distance between an i-th grid and a j-th grid; and when d(i, j) increases, influence of the correlation coefficient $r_j$ of the neighboring grid on $C_i$ is smaller, and an amount of calculation is reduced by presetting distance threshold according to a data scale in general.

In the step S5, the rearranging is to directly and randomly rearrange the observed precipitation and climate index time series of each grid.

The step S6 specifically includes:

judging the spatial clustering significance of teleconnection, an original hypothesis corresponding to a spatial clustering significance being that there is no significant correlation between the climate index and the observed precipitation, that is to say, the teleconnection is non-significant; then, recalculating $r_i(r_j)$ and corresponding $C_i$ by randomly arranging a historical climate index and observed precipitation sequence of the i (j)-th grid; and establishing the reference empirical distribution H of $C_i$ by multiple times of repeated calculation.

The step S7 specifically includes:

obtaining a $p_i$ value corresponding to observed $C_i$ according to the reference empirical distribution H to represent a strength when the original hypothesis is true, and calculating a classification of the grid i according to the observed $r_i$ and a corresponding $p_i$ value:

$$case_i = \begin{cases} PP & (r_i > 0) \cup (p_i > 1 - \alpha/2) \\ PN & (r_i > 0) \cup (p_i < \alpha/2) \\ ns & (\alpha/2 \leq p_i \leq 1 - \alpha/2) \\ NP & (r_i < 0) \cup (p_i < \alpha/2) \\ NN & (r_i < 0) \cup (p_i > 1 - \alpha/2) \end{cases}$$

where PP represents that r of a certain grid point and surrounding grid points thereof is significantly positive; PN represents that r of a certain grid is positive, but values of r of surrounding grids thereof are relatively low or negative, and ns represents that $r_i$ of a grid and $r_j$ of surrounding grids thereof are non-significant; NP represents that negative $r_i$ is surrounded by positive $r_j$; a last case is that NN represents that negative $r_i$ is surrounded by negative $r_j$; PP and NN represent that the value of r has a relatively high spatial positive correlation, prompting existence of regional clustering; and PN and NN reflects heterogeneity of a spatial distribution of r.

In the above solution, the final grid classification result in the present invention specifically includes PP (a significant positive teleconnection grid is surrounded by a teleconnection grid with same symbol), PN (an outlier), ns (a non-significant grid), NP (an outlier), and PP (a significant negative teleconnection grid is surrounded by a grid with same symbol).

Compared with the prior art, the technical solution of the present invention has the following beneficial effects:

According to a teleconnection pattern-oriented spatial association clustering method provided by the present invention, by taking into account the degree of teleconnection between each spatial grid cell and a neighboring cell, on the basis of a definition of a local Moran index, a calculation formula for the local Moran index is improved to obtain a new local indicator of spatial association of anomaly correlation (LISAAC), to realize the detection of a significant positive or negative teleconnection clustering range, and to realize the identification of an outlier; and spatial clustering of different types of teleconnections can be realized according to the standardized property of a teleconnection coefficient itself, and a result facilitates horizontal comparison among the degrees of teleconnection in different seasons.

DETAILED DESCRIPTION OF THE EMBODIMENTS

The accompanying drawings are merely used for exemplary description, and should not be construed as a limitation to this patent.

In order to better illustrate this embodiment, some parts of the accompanying drawings will be omitted, enlarged or reduced, and do not represent the size of an actual product.

For those skilled in the art, it is understandable that some well-known structures and their descriptions may be omitted in the accompanying drawings.

The technical solution of the present invention is further described below with reference to the accompanying drawings and the embodiments.

Embodiment 1

Figure 1:
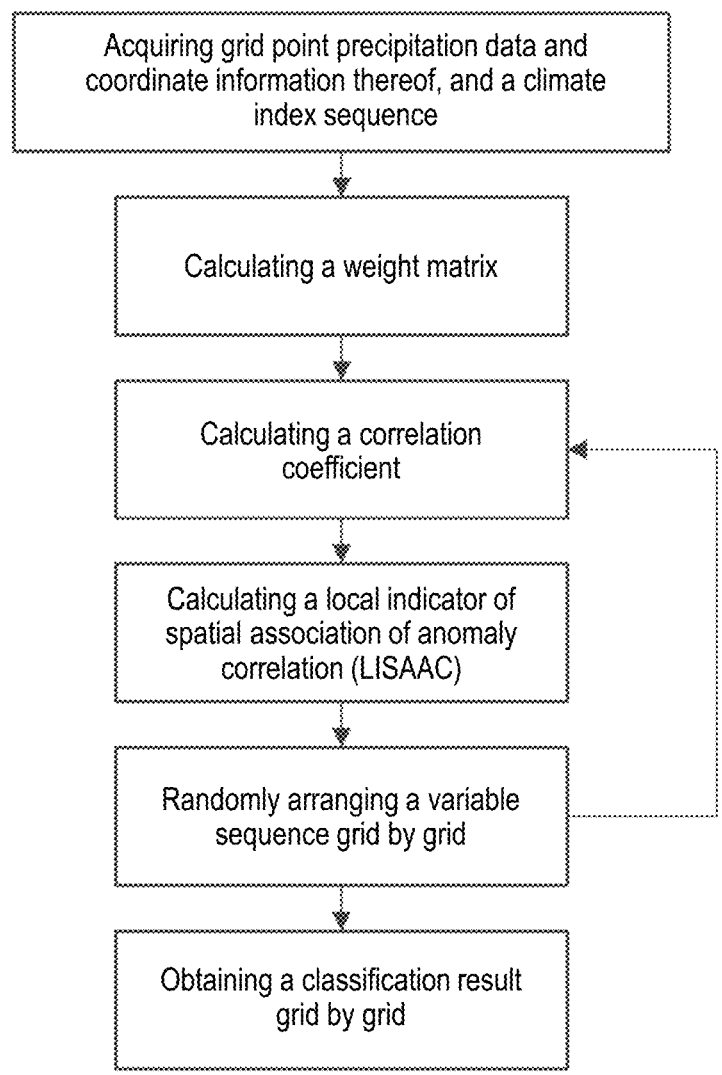
FIG. 1 is a schematic flowchart of a method in the present invention.

As shown in FIG. 1, a teleconnection pattern-oriented spatial association clustering method, including the following steps:

S1: coordinate information of a spatial grid in a research region is acquired, and a spatial weight matrix is calculated according to the coordinate information;

S2: acquiring grid-scale precipitation data in the research region and large-scale climate indices in a same time range, and obtaining a precipitation and climate index time series;

S3: a correlation coefficient r of precipitation and the climate index is calculated grid by grid according to the obtained precipitation and climate index time series;

S4: a local indicator of spatial association of anomaly correlation (LISAAC) is calculated grid by grid according to the correlation coefficient r and the spatial weight matrix;

S5: the precipitation and climate index time series in the step S2 is rearranged to obtain a new precipitation and climate index time series, and the steps S3 to S4 are repeated until a preset number n of iterations is reached;

S6: a reference empirical distribution H is established according to n groups of random LISAAC obtained in the step S4; and S7: a classification result of each grid at a specified significance level is obtained according to the observed LISAAC, the observed correlation coefficient r, and the empirical distribution H.

More specifically, in the step S1 of calculating the spatial weight matrix, a distance is represented with a Euclidean distance.

More specifically, in the step S1 of calculating the spatial weight matrix, a weight is represented with an inverse of square of the distance.

More specifically, in the step S2, an observed climate index is denoted as:

$$X[x_t]$$

where $x_t$ is an index value observed in a t-th year, and X is a set comprising of $x_t$; a total number of grids is denoted as N, i is taken as a grid index, and similarly, an observed precipitation is denoted as:

$$Y=[y_{t,i}]$$

where $y_{t,i}$ is an index value observed on a grid a in the t-th year, and Y is a set of comprising $y_{t,i}$.

More specifically, in the step S3, for a given grid i, the correlation coefficient between a climate factor and the precipitation is obtained from sequences X and Y:

$$r = \frac{\sum_t (rx_t - \overline{rx})(ry_t - \overline{ry})}{\sqrt{\sum_t (rx_t - \overline{rx})^2} \sqrt{\sum_t (ry_t - \overline{ry})^2}}$$

where $rx_t(ry_t)$ represents the climate factor in the t-th year, that is, an order of the observed precipitation in an original sequence, and $\overline{rx}(\overline{ry})$ represents a mean value of a sequence $rx_t(ry_t)$; a value of r is between −1 and 1, and when two variables are completely monotonically correlated, the value of r is 1 or −1; and for the grid i, the calculated correlation coefficient can be denoted as $r_i$, such that a set R=$[r_i]$ comprising of the correlation coefficient can be obtained.

More specifically, in the step S4, a calculation formula for the local indicator of spatial association of anomaly correlation (LISAAC) is specifically as follows:

$$C_i = r_i \frac{\sum_{j=1, j \neq i}^{N} w_{i,j} r_j}{\sum_{j=1, j \neq i}^{N} w_{i,j}}$$

where $w_{i,j}$ is a weight coefficient that relates $r_i$ to $r_j$ of a neighboring grid;

$$\sum_{j=1, j \neq i}^{N} w_{i,j} r_j / \sum_{j=1, j \neq i}^{N} w_{i,j}$$

is a spatial weighted correlation coefficient of the neighboring grid of the grid i; $C_i$ describes strength of a relationship between $r_i$ and $r_j$ of the neighboring grid of the grid i; and the weight coefficient in the formula is an important parameter influencing $C_i$.

In the specific implementation process, the correlation coefficient is used without performing centralization processing for the LISAAC calculation in the step S4.

More specifically, in order to enable the weight coefficient attenuated with an increase of the distance, the distance is calculated by means of inverse distance weighting and a Euclidean algorithm, and the inverse of square of the distance is used as a distance weight coefficient between two grids:

$$w_{i,j} = \frac{1}{d(i, j)^2}$$

where $d(i, j)$ is a Euclidean distance between an i-th grid and a j-th grid; and when $d(i, j)$ increases, influence of the correlation coefficient $r_j$ of the neighboring grid on $C_i$ is smaller, and an amount of calculation is reduced by presetting a distance threshold according to data scale in general.

More specifically, in the step S5, the rearranging is to directly and randomly rearrange the observed precipitation and climate index time series of each grid.

More specifically, the step S6 specifically includes:

The spatial clustering significance of teleconnection is judged, where an original hypothesis corresponding to the spatial clustering significance is that there is no significant correlation between the climate index and the observed precipitation, that is to say, the teleconnection is non-significant; then, $r_i(r_j)$ and corresponding $C_i$ are recalculated by randomly arranging a historical climate index and observed precipitation sequence of the i (j)-th grid; and the reference empirical distribution H of $C_i$ is established by multiple times of repeated calculation.

More specifically, the step S7 specifically includes:

A $p_i$ value corresponding to observed $C_i$ is obtained according to the reference empirical distribution H to represent a strength when the original hypothesis is true, and a classification of the grid i is calculated according to observed $r_i$ and a corresponding $p_i$ value:

$$\text{case}_i = \begin{cases} PP & (r_i > 0) \cup (p_i > 1 - \alpha/2) \\ PN & (r_i > 0) \cup (p_i < \alpha/2) \\ ns & (\alpha/2 \le p_i \le 1 - \alpha/2) \\ NP & (r_i < 0) \cup (p_i < \alpha/2) \\ NN & (r_i < 0) \cup (p_i > 1 - \alpha/2) \end{cases}$$

where PP (positive and positive) represents that r of a certain grid point and surrounding grid points thereof is significantly positive; PN (positive and negative) represents that r of a certain grid is positive, but values of r of surrounding grids thereof are relatively low or negative, and ns (non-significance) represents that $r_i$ of a grid and $r_j$ of surrounding grids thereof are non-significant; NP (negative and positive) represents that negative $r_i$ is surrounded by positive $r_j$; a last case is that NN (negative and negative) represents that negative $r_i$ is surrounded by negative $r_j$; PP and NN represent that the value of r has a relatively high spatial positive correlation, prompting the existence of regional clustering; and PN and NN reflects heterogeneity of a spatial distribution of r.

In the specific implementation process, the final grid classification result in the present invention specifically includes PP (a significant positive teleconnection grid is surrounded by a teleconnection grid with same symbol), PN (an outlier), ns (a non-significant grid), NP (an outlier), and PP (a significant negative teleconnection grid is surrounded by a grid with same symbol).

Embodiment 2

More specifically, on the basis of Embodiment 1, this embodiment illustrates the effect of the method through an experiment. By taking 1982-2010 global seasonal grid precipitation data of the United States Climate Prediction Center (CPC) and an indicator Niño3.4 as an example, a spatial association cluster of El Niño-Southern Oscillation (ENSO) and a teleconnection pattern of global seasonal precipitation is calculated. By taking a significance level a of 0.10 as an example, an LISAAC is calculated, and meanwhile a grid significance classification result without consideration of spatial association is compared with a result calculated by means of a local Moran index.

Figure 2:
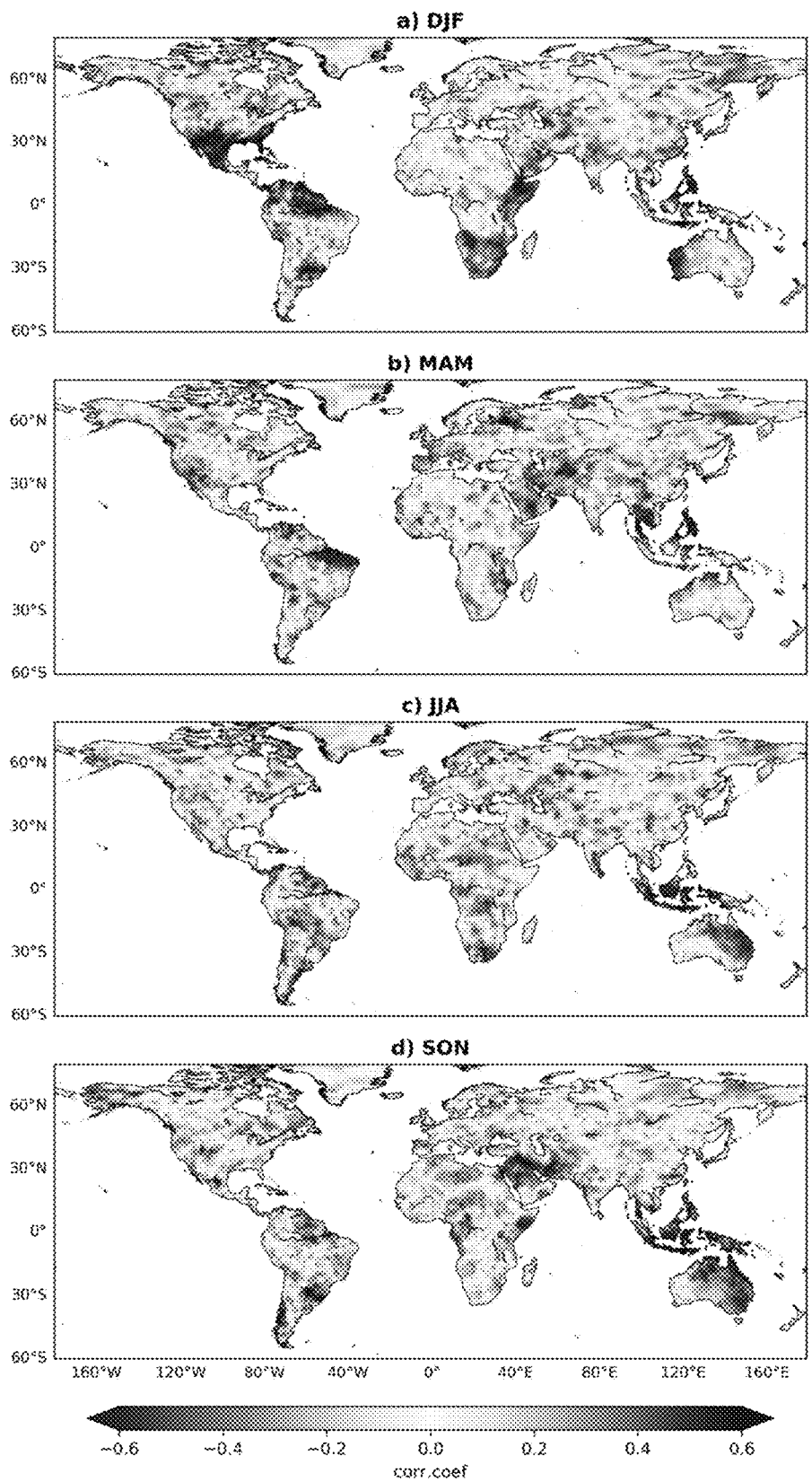
FIG. 2 is a spatial distribution diagram of teleconnection coefficients in four seasons.
Figure 3:
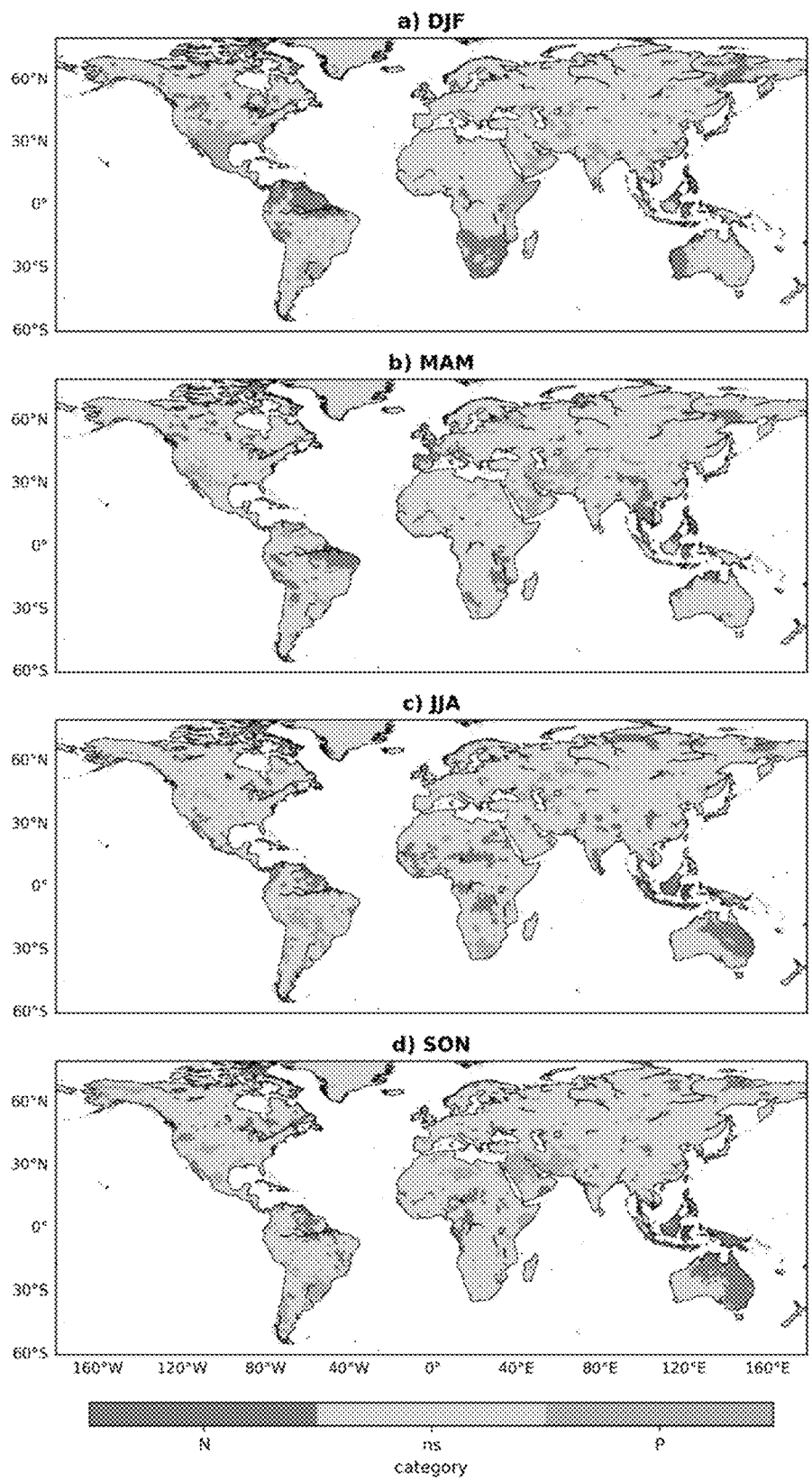
FIG. 3 is a spatial clustering diagram obtained based on calculation of a significance level.

FIG. 2 shows a spatial distribution diagram of teleconnection coefficients in winter, spring, summer, and autumn (denoted as December-January-February (DJF), March-April-May (MAM), June-July-August (JJA) and September-October-November (SON), respectively) of the northern hemisphere. If a spatial association relationship is not considered, and only the significance of correlation coefficients of grids is used as a classification basis, the grids can be classified into P, ns, and N, namely, positive $r_i$, a non-significant grid, and negative $r_i$. FIG. 3 gives a result of classifying the grids according to the significance of the correlation coefficients under the condition that the spatial relationship is not considered. A spatial distribution diagram of the classified grids shows that there are many regions where precipitation is significantly affected by ENSO. For example, a region from southern United States to northern Mexico, a northern region of South America, and relatively large-area regions of South Africa, East Africa, Southeast Asia, and Western Australia in winter are affected by different degrees and forms of ENSO. Similarly, in spring, summer, and autumn, classification charts can effectively reflect a clustered teleconnection pattern. However, compared with some regions where teleconnections are continuously distributed and coverage areas are relatively large, it can be seen from the classification charts that in some regions (especially high-latitude regions), the distribution of P and N grids is relatively scattered; and moreover, in some neighboring regions, both types of P and N grids appear at the same time. Such method for classifying the grids directly by the significance of the grids can effectively reflect the significance of the grids, but cannot reflect the above-mentioned spatial information, that is, whether some scattered grids appeared are spatial outliers. Is there a significant spatial correlation among such large-area teleconnections that spatially appear in blocks?

In order to quantify such spatial information of teleconnection, the local Moran index is further calculated. A calculation formula for the local Moran index is as follows:

$$I_i = \frac{(r_i - \bar{r}) \frac{\sum_{j=1, j \ne i}^{N} w_{i,j}(r_j - \bar{r})}{\sum_{j=1, j \ne i}^{N} w_{i,j}}}{\frac{1}{N} \sum_{i=1}^{N} (r_i - \bar{r})^2}$$

Different from the LISAAC proposed in the present invention, an original hypothesis of the local Moran index is that neighboring points of $r_i$ are randomly distributed. Therefore, the significance of $I_i$ is tested by a reference distribution obtained by randomly arranging $r_j$. Similarly, a significance level a is given, and the grids can be classified according to quantiles $I_{\alpha/2}$ and $I_{1-\alpha/2}$ as follows:

$$\text{case}_i = \begin{cases} HH & (I_i > I_{1-\alpha/2}) \cup (r_i > \bar{r}) \\ HL & (I_i < I_{\alpha/2}) \cup (r_i > \bar{r}) \\ ns & (I_{\alpha/2} \le I_i \le I_{1-\alpha/2}) \\ LH & (I_i < I_{\alpha/2}) \cup (r_i < \bar{r}) \\ LL & (I_i < I_{1-\alpha/2}) \cup (r_i < \bar{r}) \end{cases}$$

Compared with the LISAAC, the local Moran index gives a high (low) degree relative to $\bar{r}$, so a classification result includes HH (high and high), HL (high and low), ns (non-significance), LH (low and high), and LL (low and low). HH represents that values of r of a certain grid and of other surrounding grids are relatively high, and HL represents that r is relatively high for a certain grid but is relatively low for surrounding points. LH and LL are just opposite. HH and LL represent that there is a relatively high spatial positive correlation, which indicates that there is regional similarity. LH and HL represent that there is a relatively strong spatial negative correlation, that is to say, there is regional heterogeneity.

Figure 4:
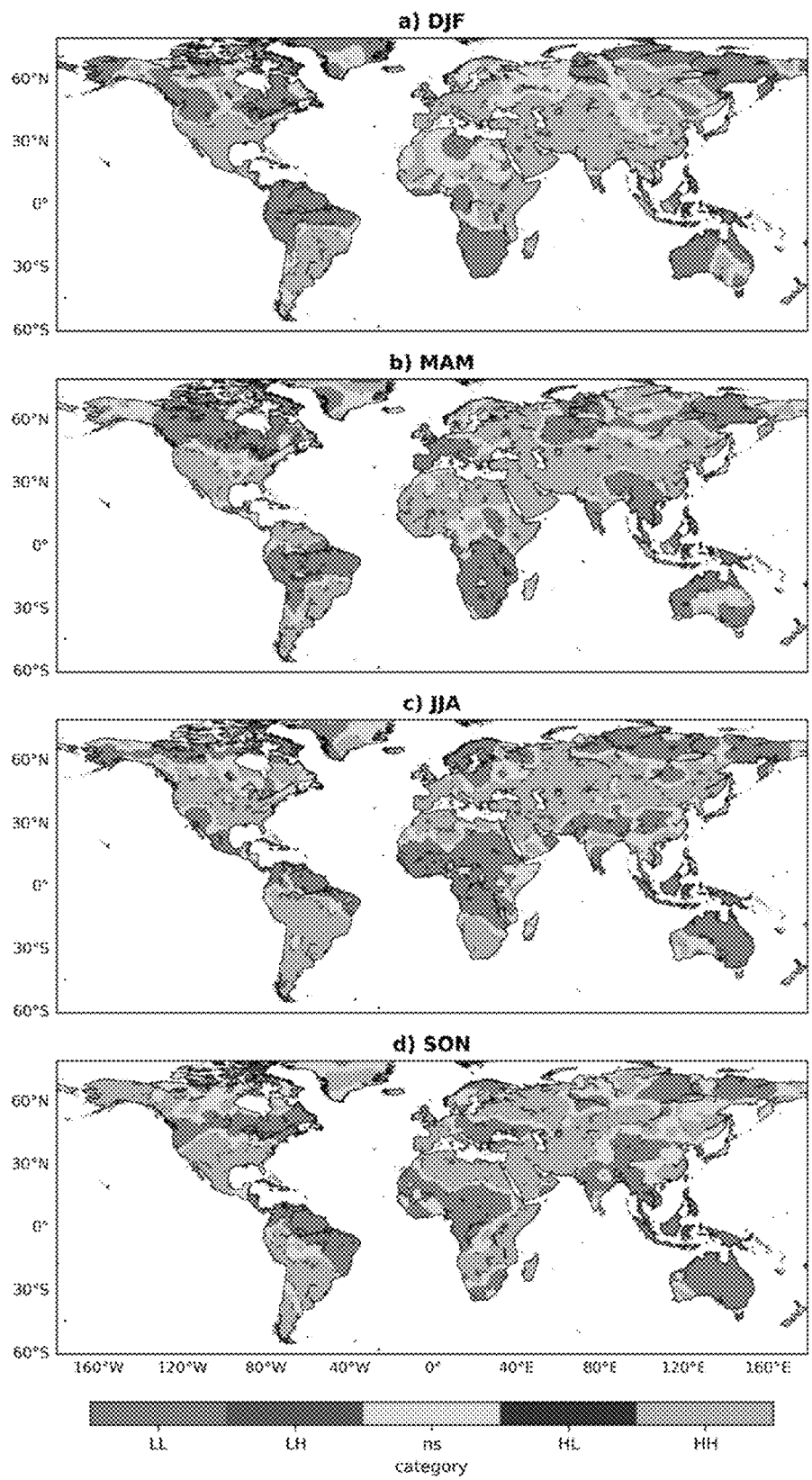
FIG. 4 is a spatial clustering diagram obtained based on calculation of a local Moran index.

In the specific implementation process, FIG. 4 gives a result of classifying the grids according to the local Moran index I under the condition that the spatial relationship is considered. Due to the consideration of $\bar{r}$ in calculation of the local Moran index, the spatial classification diagram gives a spatial clustering result of relatively low and high values compared with a global mean value in each season. Compared with the classification directly according to the significance of the grids, the local Moran index prompts that there is relatively strong heterogeneity of teleconnection relationships in some regions. For example, some positive teleconnection relationships appear in central South America in spring, and surrounding teleconnections thereof are mainly negative teleconnections. These special teleconnection relationships may be caused by observational errors, or may be from influences caused by local topography such as high mountains, soil humidity, glaciers melting, and other climate factors. These special relationships are important factors in the study of seasonal precipitation, and the local Moran index effectively provides a method for identifying such relationships. However, due to standardization processing in calculation of the local Moran index, a calculation result takes into account a global mean value $\bar{r}$ of a target season, which causes that results of four seasons cannot be compared horizontally. As shown in FIG. 4, South America has large-area teleconnection effects in summer. Such teleconnections have very strong spatial similarity (only a small number of outliers appear at the junction of southwest and northeast clustering regions), and the local Moran index well describes such spatial clustering. It can be seen from the distribution diagram of correlation coefficients in FIG. 2 that compared with winter, although there is relatively good spatial similarity, in fact, the overall ranges of such teleconnection effects in summer are relatively small, and the grids with non-significant correlation coefficients are also divided into HH and LL. FIG. 4 cannot reflect the change of such overall ranges and the significance of the correlation coefficients of the grids.

Figure 5:
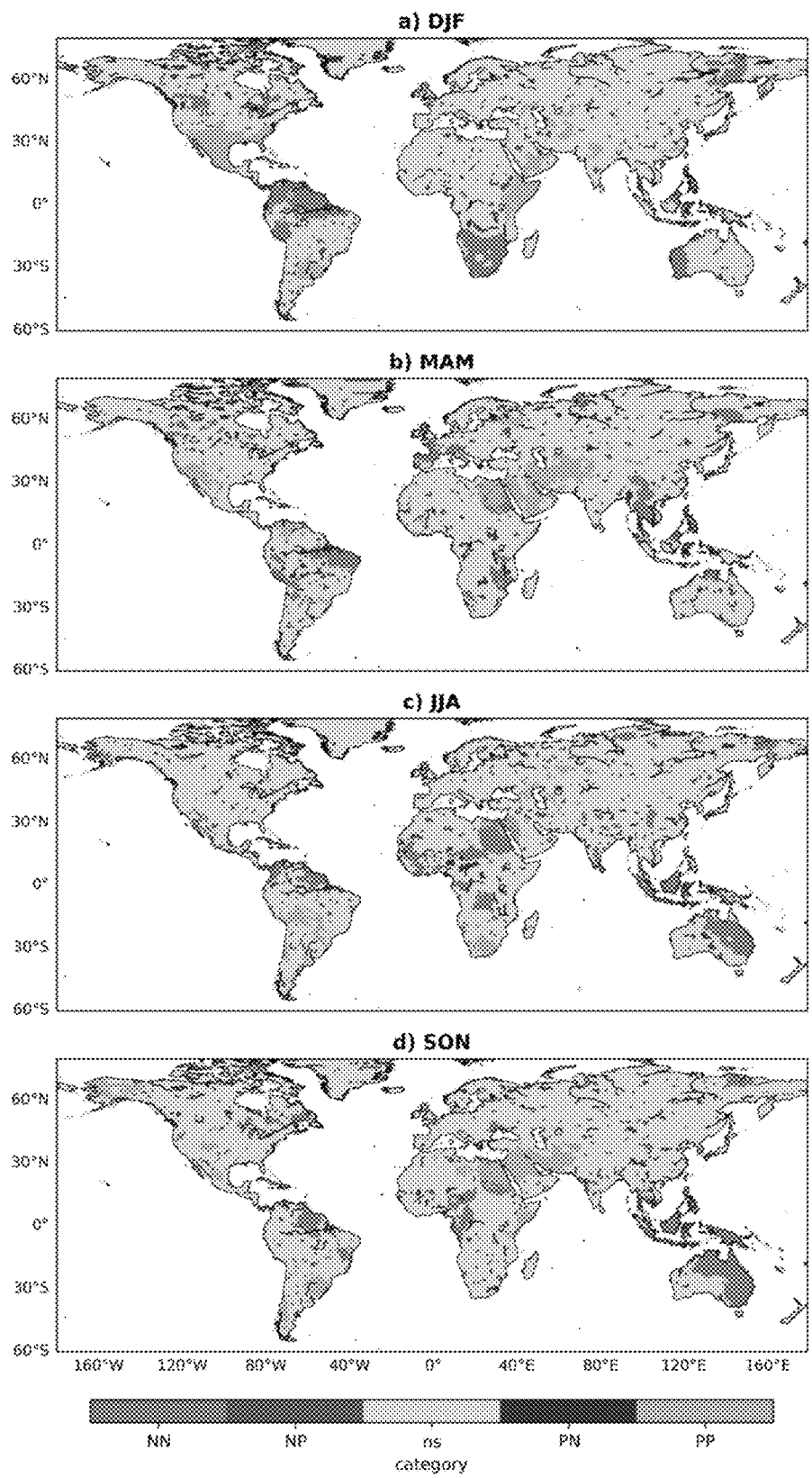
FIG. 5 is a spatial clustering diagram obtained based on a local indicator of spatial association of anomaly correlation (LISAAC) provided by the present invention.

In order to simultaneously quantify the spatial association features and the teleconnection ranges of the teleconnections, the calculation result of the local indicator of spatial association of anomaly correlation (LISAAC) provided by the present invention is used, as shown in FIG. 5. Similar to FIG. 3, in which several major regions with spatial teleconnection clustering, such as a region from southern United States to northern Mexico, northern South America, East Africa, South Africa, Western Australia, and Southeast Asia in winter, can be seen. Meanwhile, the LISAAC also shows some "abnormal" regions, such as small PN regions along the coasts of Peru and Ecuador. The positive teleconnection effect here is mainly due to abnormal warming of the Eastern Pacific Ocean in El Niño years, and makes the Walker circulation of the equatorial Pacific in normal years move. The center of convection moves to the central and eastern Pacific, resulting in abnormally increased precipitation on the west coast of South America. Such movement of the center of convection also causes the eastern part of South America to become an abnormal sinking region of airflow. Meanwhile, the sea temperature of the eastern Pacific is increased to reduce the sea temperature gradient along the coast of Colombia, so the precipitation in the northern part of South America is abnormally less. The LISAAC based classification results can well identify the spatial relationship between such negative teleconnection effects and a small number of positive correlation effects. In FIG. 3, the spatial heterogeneity of such PN along the coast of Peru and Ecuador in winter is not reflected.

Figure 6:
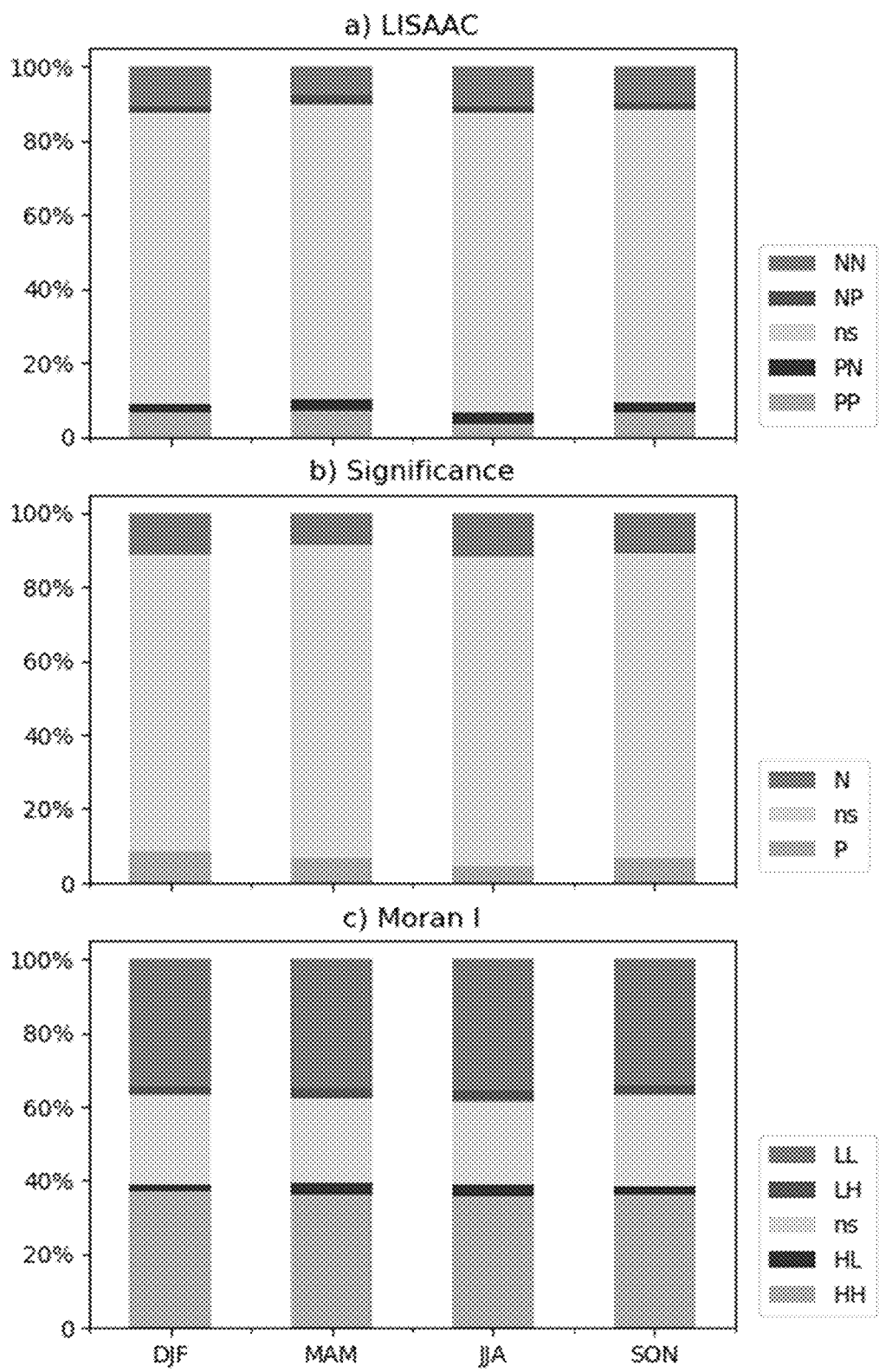
FIG. 6 is a stacked bar chart of a proportion of each type of grid in four quarters under three methods.

FIG. 6 respectively gives the proportions of classified grids calculated by means of three methods. FIG. 6a is a grid classification calculated by means of the LISAAC provided by the present invention. It can be obviously seen that although studies have shown that seasonal precipitation in most regions of the world is affected by different degrees of ENSO teleconnection effects, most grids show non-significant teleconnection effects. On one hand, that may be because such teleconnection effects are affected by other climate factors such as snow melt, soil humidity, and topography, and on the other hand, that may be because ENSO signals are relatively weak in these regions or seasons. In addition, it can be seen that the proportion of the grids occupied by the positive teleconnection effect in summer is lower than that in other three seasons. On the contrary, the proportion of the negative teleconnection effect is higher. In contrast, if the spatial information of the grids is not considered, and the grids are classified only according to the significance of teleconnections, a similar result (FIG. 6b) can be obtained, that is to say, the proportion of the non-significant teleconnection effect is highest. However, some special spatial heterogeneities, such as the positive teleconnection effect along the western coast of South America in winter, and the positive correlation effect from Canada to the northern United States, cannot be reflected in FIG. 6b. Finally, a result of the local Moran index given in FIG. 6c only takes into account the effect of spatial correlation, and ignores the significance of teleconnection, so there is a completely different result from FIGS. 6a-b: the proportion of non-significant grids in four seasons is relatively low. This is because the local Moran index takes into account the high or low degree compared with the global mean value, and the original hypothesis is not whether the teleconnection is significant, but whether the variables are randomly distributed in space. Therefore, although the Moran index based classification can effectively identify spatial features of teleconnection, it is difficult to distinguish whether there is a significant teleconnection effect.

The above experimental result shows that the present invention takes into account the standardization property of the correlation coefficient to realizes spatial clustering of different types of teleconnections, by combining with spatial information of variables. The result facilitates horizontal comparison among the degrees of teleconnection in different seasons.

The terms for describing positional relationships in the accompanying drawings are merely used for exemplary description, and should not be construed as a limitation to this patent.

Apparently, the above-mentioned embodiments of the present invention are only examples for clearly illustrating the present invention, and are not intended to limit the implementation modes of the present invention. Those of ordinary skill in the art may also make other changes or modifications in different forms on the basis of the above description. All implementation modes do not need to and cannot be exhausted here. Any modifications, equivalent substitutions, and improvements made within the spirit and principle of the present invention should be included within the scope of protection of the claims of the present invention.

What is claimed is:

1. A teleconnection pattern-oriented spatial association clustering method, comprising following steps:
   S1: acquiring coordinate information of a spatial grid in a research region, and calculating a spatial weight matrix according to the coordinate information;
   S2: acquiring grid-scale precipitation data in the research region and large-scale climate indices in a same time range, and obtaining a precipitation and climate index time series;
   S3: calculating a correlation coefficient r of a precipitation and the climate index grid by grid according to the precipitation and climate index time series, wherein the precipitation and climate index time series are obtained;

S4: calculating a local indicator of spatial association of anomaly correlation (LISAAC) grid by grid according to the correlation coefficient r and the spatial weight matrix;

S5: rearranging the precipitation and climate index time series in the step S2 to obtain a new precipitation and climate index time series, and repeating the steps S3 to S4 until a preset number n of iterations is reached;

S6: establishing a reference empirical distribution H according to n groups of random the LISAAC obtained in the step S4; and S7: obtaining a classification result of each of grids at a specified significance level according to the LISAAC, the correlation coefficient r, and the reference empirical distribution H, wherein the LISAAC and the correlation coefficient r are observed.

2. The teleconnection pattern-oriented spatial association clustering method according to claim 1, wherein the step S1 of calculating the spatial weight matrix, a distance is represented with a Euclidean distance.

3. The teleconnection pattern-oriented spatial association clustering method according to claim 1, wherein the step S1 of calculating the spatial weight matrix, a weight is represented with an inverse of square of a distance.

4. The teleconnection pattern-oriented spatial association clustering method according to claim 1, wherein the step S2, an observed climate index is denoted as:

$$X=[x_t],$$

wherein $x_t$ is an index value observed in a t-th year, and X is a set comprising of $x_t$; a total number of the grids is denoted as N, i is taken as a grid index, and similarly, an observed precipitation is denoted as:

$$Y=[y_{t,i}]$$

wherein $y_{t,i}$ is an index value observed on a grid i in the t-th year, and Y is a set comprising of $y_{t,i}$.

5. The teleconnection pattern-oriented spatial association clustering method according to claim 4, wherein the step S3, for a given grid i, the correlation coefficient between a climate factor and the precipitation is obtained from sequences X and Y:

$$r = \frac{\sum_t (rx_t - \overline{rx})(ry_t - \overline{ry})}{\sqrt{\sum_t (rx_t - \overline{rx})^2} \sqrt{\sum_t (ry_t - \overline{ry})^2}},$$

wherein $rx_t(ry_t)$ represents the climate factor in the t-th year, that is, an order of the observed precipitation in an original sequence, and $\overline{rx}(\overline{ry})$ represents a mean value of a sequence $rx_t(ry_t)$; a value of r is between −1 and 1, and when two variables are completely monotonically correlated, the value of r is 1 or −1; and for the grid i, the correlation coefficient, which is calculated, can be denoted as $r_i$, such that a set $R=[r_i]$ comprising of the correlation coefficient can be obtained.

6. The teleconnection pattern-oriented spatial association clustering method according to claim 5, wherein the step S4, a calculation formula for the local indicator of spatial association of anomaly correlation (LISAAC) is specifically as follows:

$$C_i = r_i \frac{\sum_{j=1, j \neq i}^{N} w_{i,j} r_j}{\sum_{j=1, j \neq i}^{N} w_{i,j}},$$

wherein $w_{i,j}$ is a weight coefficient that relates $r_i$ to $r_j$, of a neighboring grid;

$$\sum_{j=1, j \neq i}^{N} w_{i,j} r_j / \sum_{j=1, j \neq i}^{N} w_{i,j}$$

is a spatial weighted correlation coefficient of the neighboring grid of the grid i; $C_i$ describes a strength of a relationship between $r_i$ and $r_j$ of the neighboring grid of the grid i; and the weight coefficient in the formula is an important parameter influencing the $C_i$.

7. The teleconnection pattern-oriented spatial association clustering method according to claim 6, wherein in order to enable the weight coefficient attenuated with an increase of a distance, the distance is calculated by means of an inverse distance weighting and a Euclidean algorithm, and an inverse of square of the distance is used as a distance weight coefficient between two grids:

$$w_{i,j} = \frac{1}{d(i, j)^2};$$

wherein $d(i, j)$ is a Euclidean distance between an i-th grid and a j-th grid; and when $d(i, j)$ increases, influence of the correlation coefficient $r_j$ of the neighboring grid on the $C_i$ is smaller, and an amount of calculation is reduced by presetting a distance threshold according to a data scale in general.

8. The teleconnection pattern-oriented spatial association clustering method according to claim 7, wherein the step S5, the rearranging is to directly and randomly rearrange the precipitation and climate index time series, which are observed, of each of the grids.

9. The teleconnection pattern-oriented spatial association clustering method according to claim 7, wherein the step S6 specifically comprises:

judging a spatial clustering significance of teleconnection, an original hypothesis corresponding to the spatial clustering significance being that there is no significant correlation between the climate index and the observed precipitation, that is to say, the teleconnection is non-significant; then, recalculating $r_i$ ($r_j$) and corresponding the $C_i$ by randomly arranging a historical climate index and observed precipitation sequence of the i (j)-th grid; and establishing the reference empirical distribution H of the $C_i$ by multiple times of repeated calculation.

10. The teleconnection pattern-oriented spatial association clustering method according to claim 9, wherein the step S7 specifically comprises:

obtaining a $p_i$ value corresponding to the $C_i$, which are observed, according to the reference empirical distribution H to represent a strength when the original hypothesis is true, and calculating a classification of the grid i according to the $r_i$, which is observed, and a corresponding $p_i$, value:

$$\text{case}_i = \begin{cases} PP & (r_i > 0) \cup (p_i > 1 - \alpha/2) \\ PN & (r_i > 0) \cup (p_i < \alpha/2) \\ ns & (\alpha/2 \le p_i \le 1 - \alpha/2) \\ NP & (r_i < 0) \cup (p_i < \alpha/2) \\ NN & (r_i < 0) \cup (p_i > 1 - \alpha/2) \end{cases},$$

wherein PP represents that r of a certain grid point and surrounding grid points thereof is significantly positive; PN represents that r of a certain grid is positive, but values of r of surrounding grids thereof are relatively low or negative, and ns represents that $r_i$ of a grid and $r_j$ of surrounding grids thereof are non-significant; NP represents that negative $r_i$ is surrounded by positive $r_j$; a last case is that NN represents that negative $r_i$ is surrounded by negative $r_j$; PP and NN represent that the value of r has a relatively high spatial positive correlation, prompting existence of regional clustering; and PN and NN reflects heterogeneity of a spatial distribution of r.

* * * * *